United States Patent [19]
McCloskey

[11] 3,989,320
[45] Nov. 2, 1976

[54] SELF-ALIGNING BEARING WITH PRELOADING BRAKING MEMBER

[75] Inventor: Albert R. McCloskey, Fairfield, Conn.

[73] Assignee: Heim Universal Corporation, Fairfield, Conn.

[22] Filed: Apr. 7, 1975

[21] Appl. No.: 565,799

[52] U.S. Cl. .............................................. 308/72
[51] Int. Cl.² ......................................... F16C 1/24
[58] Field of Search ................................... 308/72

[56] References Cited
UNITED STATES PATENTS

| | | | |
|---|---|---|---|
| 2,488,775 | 11/1949 | Heim | 308/72 |
| 3,191,265 | 6/1965 | McCloskey | 308/72 |
| 3,589,781 | 6/1971 | Hanley et al. | 308/72 |
| 3,666,331 | 5/1972 | Curtis et al. | 308/72 |

*Primary Examiner*—M. H. Wood, jr.
*Assistant Examiner*—Gene A. Church
*Attorney, Agent, or Firm*—James C. Wray

[57] ABSTRACT

A self-aligning bearing comprising an outer member and an inner member disposed in and supported by the outer member, the outer member having a concave inner surface in bearing contact with the convex outer surface of the inner member, an annular groove provided on one of the surfaces, a resilient member filling said annular groove, the resilient member being in a substantially compressed state to exert a preloading braking force on the inner and outer members.

6 Claims, 3 Drawing Figures

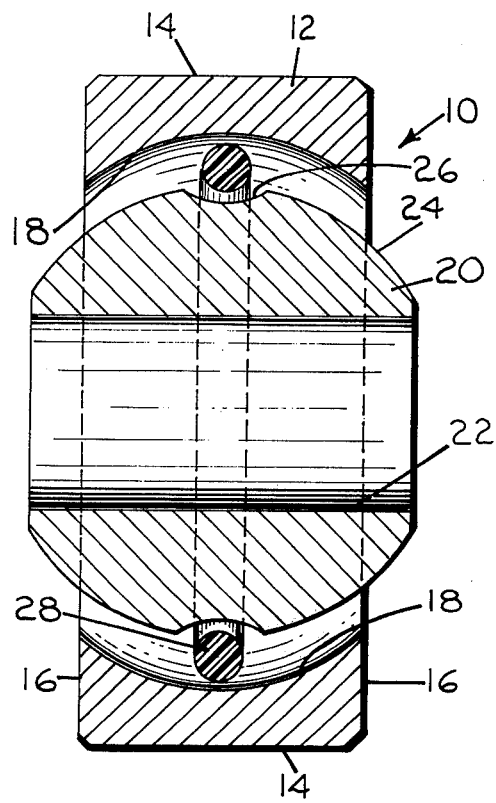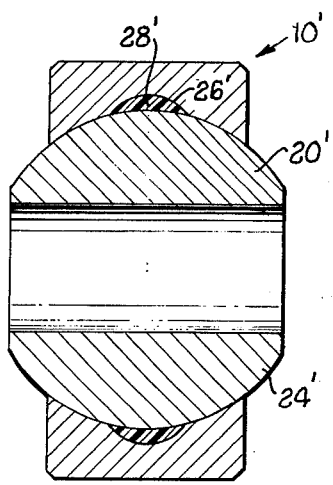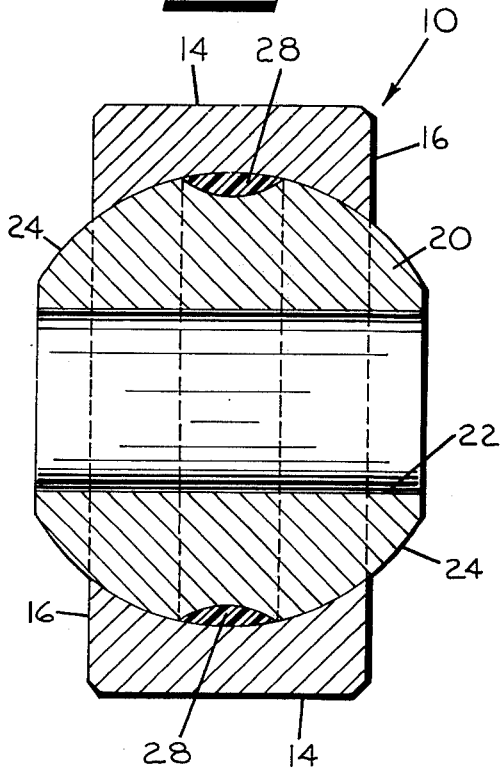

SELF-ALIGNING BEARING WITH PRELOADING BRAKING MEMBER

BACKGROUND OF THE INVENTION

This invention relates generally to self-aligning bearings, including spherical bearings and spherical rod end bearings. More particularly, the present invention relates to self-aligned bearings provided with a preloaded braking member. The present invention also contemplates the unique method of manufacturing the above referenced two type bearings.

The self-aligning form of bearing has found wide acceptance in industry and has been used in a multiplicity of applications in a variety of environments. One such application may be described as an "exception type" bearing application. In this particular application, the primary purpose of the bearing is to provide an operative attachment between two members and on an exceptional basis provide a bearing support between the two members so operatively attached. More specifically, this application requires that the two members, that is the inner member and outer member, remain relatively movable under certain predetermined load situations. When this predetermined load situation or amount is exceeded, then the bearing must provide for the relative movement of the two so operatively attached members.

The typical prior art approach provided such an exception type or "stiff" bearing to cause an interference fit between the inner and outer members at their respective bearing surfaces. This is done by either oversizing the inner member or undersizing the outer member. This has proven substantially satisfactory because the movement of the inner member with respect to the outer member will ultimately cause a degree of wear and such wear will render the bearing assembly "loose."

SUMMARY OF THE INVENTION

It is therefore the primary purpose of the present invention to provide a self-aligning bearing comprising an outer member and an inner member disposed in and supported by said outer member, said outer member having a concave inner surface in bearing contact with the convex outer surface of said inner member, an annular groove provided on one of said surfaces, a resilient member filling said annular groove, said resilient member being in a substantially compressed state to exert a preloading braking force on said inner and outer members.

It is another object of the present invention to provide a self-aligning bearing wherein said annular groove is disposed on the convex outer surface of said inner member.

It is yet another object of the present invention to provide a self-aligning bearing wherein said annular groove is disposed on the concave inner surface of said outer member.

It is still another object of the present invention to provide a self-aligning bearing wherein said resilient member is an O-ring member.

It is still another object of the present invention to provide a self-aligning bearing wherein said resilient member totally fills said annular groove.

It is another object of the present invention to provide a self-aligning bearing wherein said annular groove is a relatively shallow concave annular depression of uniform cross section.

It is yet another object of the present invention to provide a method of manufacturing a self-aligning bearing including the steps of preforming an outer member with a concave inner surface, preforming an inner member with a convex outer surface, forming an annular groove on one of said surfaces, inserting said inner member within said outer member, disposing a resilient member in said groove, deforming at least one of said members such that said inner concave surface of said outer member is in bearing contact with the convex outer surface of said inner member, compressing said resilient member in said annular groove to fill said groove.

It is still another object of the present invention to provide a method of manufacturing a self-aligning bearing wherein said outer member is compressed about said inner member.

It is still another object of the present invention to provide a method of manufacturing a self-aligning bearing wherein said inner member is expanded within said outer member.

It is yet another object of the present invention to provide a method of manufacturing a self-aligning bearing wherein said outer member is compressed about said inner member and said inner member is expanded within said outer member.

It is another object of the present invention to provide a method of manufacturing a self-aligning bearing wherein said resilient member disposed within said annular groove is an O-ring member.

It is a further object of the present invention to provide a self-aligning bearing and a method of manufacturing the same which are readily adaptable to high volume techniques and apparatus and are inexpensive to manufacture and practice.

It is a further object of the present invention to provide a spherical bearing which is simplistic in design and provides a positive preloading braking force on the various operative parts of the bearing.

It is a further object of the present invention to provide a spherical bearing wherein the braking force will not substantially diminish over long periods of use.

Other objects and advantages of the invention will become apparent as the present invention is better understood from the following disclosure and as shown in the accompanying drawings.

DESCRIPTION OF THE DRAWINGS

FIG. 1 is a side sectional view in elevation of a self-aligning bearing assembly shown in a partially assembled state in accordance with the present invention;

FIG. 2 is a side elevational view of the self-aligning bearing of FIG. 1 in its assembled state.

FIG. 3 is a sectional view of a modified form of the self-aligning bearing of the invention.

DESCRIPTION OF THE INVENTION

Referring now to the figures and, in particular, FIGS. 1 and 2, there is shown a spherical bearing 10 in its partially assembled state (FIG. 1) and its completely assembled state (FIG. 2).

The bearing 10 is provided with essentially three parts. The first part is the outer member 12 whose outer surface or configuration may be changed to fit the particular application to which the bearing 10 is to be applied. The outer member 12 may be provided with an outer cylindrical surface 14 and two radially extending faces 16. The outer member 12 is further provided with a concave inner surface 18.

A second operative member of the spherical bearing 10 is the inner member 20. The inner member 20 is provided with a central aperture bore 22. The bore 22 and outer cylindrical surface 14 of the outer member 12 typically provide the attaching surfaces by which the spherical bearing 10 may be operatively attached to an associated apparatus or device (not shown).

The inner member is further provided with a convex outer surface 24. It is the mating of the convex outer surface 24, of the inner member 20 and the concave inner surface 18 with outer member 12 that provides the bearing support for operational movement of the inner member 20 with respect to the outer member 12.

At this juncture in the description of the spherical bearing 10, it may be stated that the features above described are generally to be found in the prior art. The jumping-off point for the present invention is to be found in the provision of an annular groove 26 on the convex outer surface 24 of the inner member 20. The annular groove 26 may be characterized as a relatively shallow concave annular depression of a generally uniform cross section. The annular groove 26 is so sized as to receive a resilient member 28. The relative size of the resilient member 28 and the annular groove 26 is of importance and will be described in further detail later. The resilient member 28 may be an annular O-ring member.

Referring now specifically to FIG. 1, the spherical bearing assembly is shown in the partially assembled state, that is, the spherical bearing 10 is shown with the outer member 12 out of contact with the inner member 20 at their respective bearing surfaces 18 and 24. In particular, the outer member 12 is shown having a substantially larger inside diameter than it will have in its assembled state. Furthermore, the O-ring 28 is shown in its natural state in which its cross section assumes an O-configuration. The transition of the partially assembled FIG. 1 to the assembled bearing of FIG. 2 is achieved by first compressing the outer member 12 about the inner member 20. This may be accomplished by using different apparatus such as holding or positioning the inner member 20 on a mandrel and driving the outer member 12 through a tapered die (both not shown). The action of the tapered die will compress the outer member 12 around the inner member 20 in such a manner as to bring the concave inner surface 18 of the outer member 12 in intimate contact with the convex outer surface 24 of the inner member 20. At the same time, the concave inner surface 18 of the outer member 12 will contact the outer member 12 of the resilient member 28 and compress it into the annular groove 26. The volume of the resilient member 28 must be generally equal to the volume of the space defined by the annular groove 26 and the concave inner surface 18. By so sizing the resilient member 28 with respect to the annular groove 26, the resilient member 28 will totally fill such annular groove 26 when the bearing 10 is completely assembled as shown in FIG. 2.

It can be seen therefore that the O-ring member 28 is in a compressed state and will therefore exert a preloading braking force on the inner member 20 and outer member 12. The degree of braking force will be determined by the type of material from which the O-ring 28 is manufactured. The more dense the material, the more stiff bearing 10 will become. Typically the O-ring may be manufactured from a wide range of materials such as silicone rubber, neoprene, rubber and other suitable plastic-type materials. The annular groove 26 may be formed in shapes other than the above noted shallow concave annular depression of uniform cross section. For example, the annular groove 26 may be formed in an O-shape or an open rectangular shape.

The above description and FIGS. 1 and 2 show the annular groove 26 disposed on the convex outer surface 24 of the inner member 20. The annular groove may also be provided on the concave inner surface 18 of the outer member 12. Similarly, the above description contemplates the compression of the outer member 12 about the inner member 20. The inner member 20 may be expanded to be brought in contact with the outer member 12. Furthermore, the inner member 20 will be expanded while the outer member 12 is contracted or compressed.

It can be seen therefore that the spherical bearing 10 is particularly suited for the intended application, that is to hold the outer member 12 in a relatively fixed position with respect to the inner member 20 until a certain predetermined operational load level is exceeded. At that time the spherical bearing 10 will suitably provide the necessary bearing movement to accommodate the movement of the apparatus or device to which it is operatively attached.

A modified form of the self-aligning bearing is shown in FIG. 3. In bearing 10', an annular groove 26' is formed in the outer member 12'. An O-ring 28' positioned within the groove is pressed and deformed and bears against the outer surface 24' of inner member 20'.

I claim:

1. A self-aligning bearing comprising an outer member and an inner member disposed in and supported by said outer member, said outer member having a concave inner surface in bearing contact with the convex outer surface of said inner member, an annular groove provided on one of said surfaces, a resilient preloading braking member filling said annular groove, said resilient member being in a substantially compressed state against said members to exert a preloading braking force on said inner and outer members.

2. A self-aligning bearing in accordance with claim 1 wherein said annular groove is disposed on the convex outer surface of said inner member.

3. A self-aligning bearing in accordance with claim 1 wherein said annular groove is disposed on the concave inner surface of said outer member.

4. A self-aligning bearing in accordance with claim 1 wherein said resilient member is an O-ring member.

5. A self-aligning bearing in accordance with claim 1 wherein said resilient member totally fills said annular groove.

6. A self-aligning bearing in accordance with claim 1 wherein said annular groove is a relatively shallow concave annular depression of uniform cross section.

* * * * *